United States Patent [19]
Nagata et al.

[11] Patent Number: 5,619,598
[45] Date of Patent: Apr. 8, 1997

[54] IMAGE FILING APPARATUS USING BOTH REVERSIBLE AND IRREVERSIBLE COMPRESSION

[75] Inventors: Takefumi Nagata; Hiroshi Tanaka; Kazuhiro Hishinuma, all of Tokyo, Japan

[73] Assignee: Fuji Photo Film Co., Ltd., Kanagawa, Japan

[21] Appl. No.: 217,212

[22] Filed: Mar. 24, 1994

Related U.S. Application Data

[63] Continuation of Ser. No. 747,577, Aug. 20, 1991, abandoned.

[30] Foreign Application Priority Data

Aug. 20, 1990 [JP] Japan ................................ 2-218482

[51] Int. Cl.$^6$ ......................................................... G06K 9/00
[52] U.S. Cl. .............................................. 382/305; 382/232
[58] Field of Search ..................................... 382/6, 56, 132, 382/232, 305, 306; 348/384, 400; 358/426

[56] References Cited

U.S. PATENT DOCUMENTS

| | | | |
|---|---|---|---|
| 4,641,242 | 2/1987 | Kimura | 364/414 |
| 4,694,352 | 9/1987 | Ina et al. | 358/257 |
| 4,703,350 | 10/1987 | Hinman | 358/133 |
| 4,705,953 | 11/1987 | Kimura et al. | 250/484.1 |
| 4,748,511 | 5/1988 | Nichols et al. | 358/256 |
| 4,903,317 | 2/1990 | Nishihara et al. | 382/56 |
| 5,028,785 | 7/1991 | Kimura | 250/327.2 |
| 5,048,111 | 9/1991 | Jones et al. | 382/56 |
| 5,117,287 | 5/1992 | Koike et al. | 358/133 |
| 5,172,418 | 12/1992 | Ito et al. | 382/6 |
| 5,289,548 | 2/1994 | Wilson et al. | 382/56 |

*Primary Examiner*—Andrew Johns
*Attorney, Agent, or Firm*—Sughrue, Mion, Zinn, Macpeak & Seas

[57] ABSTRACT

An image filing apparatus comprises an irreversible signal compression device for carrying out irreversible signal compression processing on an original image signal, which is made up of a series of image signal components representing an original image, and thereby generating an irreversibly compressed image signal. The irreversibly compressed image signal is stored on a first storage device. A difference operation device subtracts the image signal components of the original image signal and the irreversibly compressed image signal from each other which represent corresponding picture elements in the original image and the image represented by the irreversibly compressed image signal. A difference image signal is thereby generated which represents a difference image corresponding to the differences between the original image signal and the irreversibly compressed image signal. A reversible signal compression device carries out reversible signal compression processing on the difference image signal and thereby generates a reversibly compressed difference image signal. The reversibly compressed difference image signal is stored on a second storage device, on which information can be rewritten.

7 Claims, 2 Drawing Sheets

IMAGE FILING APPARATUS USING BOTH REVERSIBLE AND IRREVERSIBLE COMPRESSION

This is a Continuation of application Ser. No. 07/747,577 filed Aug. 20, 1991, now abandoned.

BACKGROUND OF THE INVENTION

1. Field of the Invention

This invention relates to an image filing apparatus for storing a plurality of image signals such that they may be read out of the image filing apparatus when necessary.

2. Description of the Prior Art

Image filing apparatuses for filing image signals, which represent images, have heretofore been used in various fields. For example, at medical facilities, such as hospitals, many kinds of medical images are utilized for medical treatment or research. Most of the medical images are radiation images. In recent years, many computed tomography (CT) images, magnetic resonance (MR) images, and the like, are also utilized.

The medical images should be stored to permit investigation of changes in diseases or injuries of patients, and it is legally stipulated that the medical images must be stored for a predetermined period. Therefore, in hospitals, or the like, the number of stored medical images increases daily. The medical images have heretofore been stored in the form of hard copies. However, storage as hard copies requires a large storage space and burdensome operations for control and retrieval of the medical images in hospitals, or the like.

Accordingly, in recent years, an image filing apparatus has been proposed in which images, such as medical images, are retrievably stored (i.e. filed) as image signals on a storage medium. In cases where the medical images are filed in this manner on the storage medium, the space requirement and the burden of image storage can be reduced, and the images can be retrieved easily and quickly.

The amount of data the image signal representing each image utilizes such as a medical image, is very large. Accordingly, usually, various signal compression processing methods are carried out on image signals, and the sizes of the image signals are thereby decreased. Image signals, which have thus been compressed, are then stored on a storage medium.

Signal compression processing methods are classified into reversible signal compression processing methods and irreversible signal compression processing methods.

With the reversible signal compression processing methods, an original image signal is compressed such that the original image signal can be restored completely from the compressed image signal. In such cases, an image can be reproduced from the restored image signal, which image has the same level of image quality as the original image. However, the amount of the original image signal cannot be decreased markedly, and the size of the compressed image signal is comparatively large. Therefore, with the reversible signal compression processing methods, only a comparatively small number of images can be stored in the form of image signals on a storage medium having a predetermined storage capacity. Specifically, the reversible signal compression processing methods are not advantageous from the point of view of the image filing efficiency.

On the other hand, with the irreversible signal compression processing methods, an original image signal is compressed such that the original image signal cannot be restored completely from the compressed image signal. In such cases, the size of the original image signal can be decreased comparatively markedly. However, the irreversible signal compression processing methods have a drawback in that a reproduced image is obtained from the restored image signal, which image has a lower level of image quality than the original image.

Therefore, when an image filing apparatus is designed, it is necessary to determine whether to carry out reversible signal compression processing on an image signal and store the reversibly compressed image signal, or to carry out irreversible signal compression processing on an image signal and store the irreversibly compressed image signal.

SUMMARY OF THE INVENTION

The primary object of the present invention is to provide an image filing apparatus wherein image signals are filed so that the image quality of a visible image reproduced from a compressed image signal may be kept good and, at the same time, the image filing efficiency may be kept high.

The present invention provides an image filing apparatus comprising:

i) an irreversible signal compression means for carrying out irreversible signal compression processing on an original image signal, which is made up of a series of image signal components representing an original image, and thereby generating an irreversibly compressed image signal, ii) a first storage means for storing said irreversibly compressed image signal, iii) a difference operation means for subtracting the image signal components of said original image signal and said irreversibly compressed image signal from each other which represent corresponding picture elements in said original image and the image represented by said irreversibly compressed image signal, a difference image signal being thereby generated which represents a difference image corresponding to the differences between said original image signal and said irreversibly compressed image signal, iv) a reversible signal compression means for carrying out reversible signal compression processing on said difference image signal, and thereby generating a reversibly compressed difference image signal, and v) a second storage means, on which information can be rewritten and which stores said reversibly compressed difference image signal.

Ordinarily, an image filing apparatus stores a large number of images as image signals for a long period of time. It has experimentally been known that most of the image signals read out of the image filing apparatus are the ones which were obtained comparatively recently. Therefore, a novel image filing apparatus has been proposed in, for example, Japanese Patent Application No. 2(1990)-75882. With the proposed image filing apparatus, both the irreversibly compressed image signals, the sizes of which are comparatively small, and the reversibly compressed image signals, the sizes of which are comparatively large, are prepared. As for image signals, which are to be stored for a long period of time, irreversible signal compression processing is carried out and the resulting irreversibly compressed image signals are stored. In this manner, the amounts of image signals which are stored are reduced. The reversibly compressed image signals are stored on a storage means, on which information can be rewritten. When the storage region of the storage means is filled with the reversibly compressed image signals and cannot store signals any more, old signals are erased such that new signals can be stored. As for most of the image signals which are read out of the image filing apparatus, visible images are reproduced from the reversibly compressed image signals. Therefore, the image quality of a visible image reproduced from the compressed image signal can be kept good, and the image filing efficiency can be kept comparatively high.

However, in cases where reversible signal compression processing is carried out on original image signals and the resulting reversibly compressed image signals are stored as proposed in Japanese Patent Application No. 2(1990)-75882, the amounts of the reversibly compressed image signals cannot be kept markedly small. Therefore, a storage means must be used which has a large capacity for storing the reversibly compressed image signals.

With the image filing apparatus in accordance with the present invention, in order for the aforesaid problems to be eliminated, the difference image signal is generated which represents a difference image corresponding to the differences between the original image signal and the irreversibly compressed image signal. Reversible signal compression processing is then carried out on the difference image signal, and a reversibly compressed difference image signal is thereby obtained. The reversibly compressed difference image signal is stored on the storage means.

The irreversibly compressed image, which is represented by the irreversibly compressed image signal obtained by carrying out irreversible signal compression processing on the original image signal, is not the same as the original image, but is very similar to the original image. Therefore, when the difference image signal is generated which corresponds to the differences between the original image signal and the irreversibly compressed image signal, almost all of the image signal components of the difference image signal, which represent picture elements in the difference image, take values close to zero. Reversible signal compression processing is then carried out on the difference image signal, and a reversibly compressed difference image signal is thereby obtained. Accordingly, the amount of the image signal to be stored can be reduced markedly. Also, the original image signal can be reconstructed by combining the difference image signal and the irreversibly compressed image signal. Therefore, an image having good image quality can be reproduced.

As described above, with the image filing apparatus in accordance with the present invention, irreversible signal compression processing is carried out on an original image signal, and an irreversibly compressed image signal is thereby generated. A difference image signal is then generated which represents a difference image corresponding to the difference between the original image signal and the irreversibly compressed image signal. Thereafter, reversible signal compression processing is carried out on the difference image signal, and a reversibly compressed difference image signal is thereby generated. The irreversibly compressed image signal is stored on the first storage means, and the reversibly compressed difference image signal is stored on the second storage means, on which information can be rewritten. Therefore, with the image filing apparatus in accordance with the present invention, image signals can be filed such that the image quality of a visible image reproduced from a compressed image signal may be kept good and, at the same time, the image filing efficiency may be kept high.

DESCRIPTION OF THE PREFERRED EMBODIMENTS

The present invention will hereinbelow be described in further detail with reference to the accompanying drawings.

Figure 2:
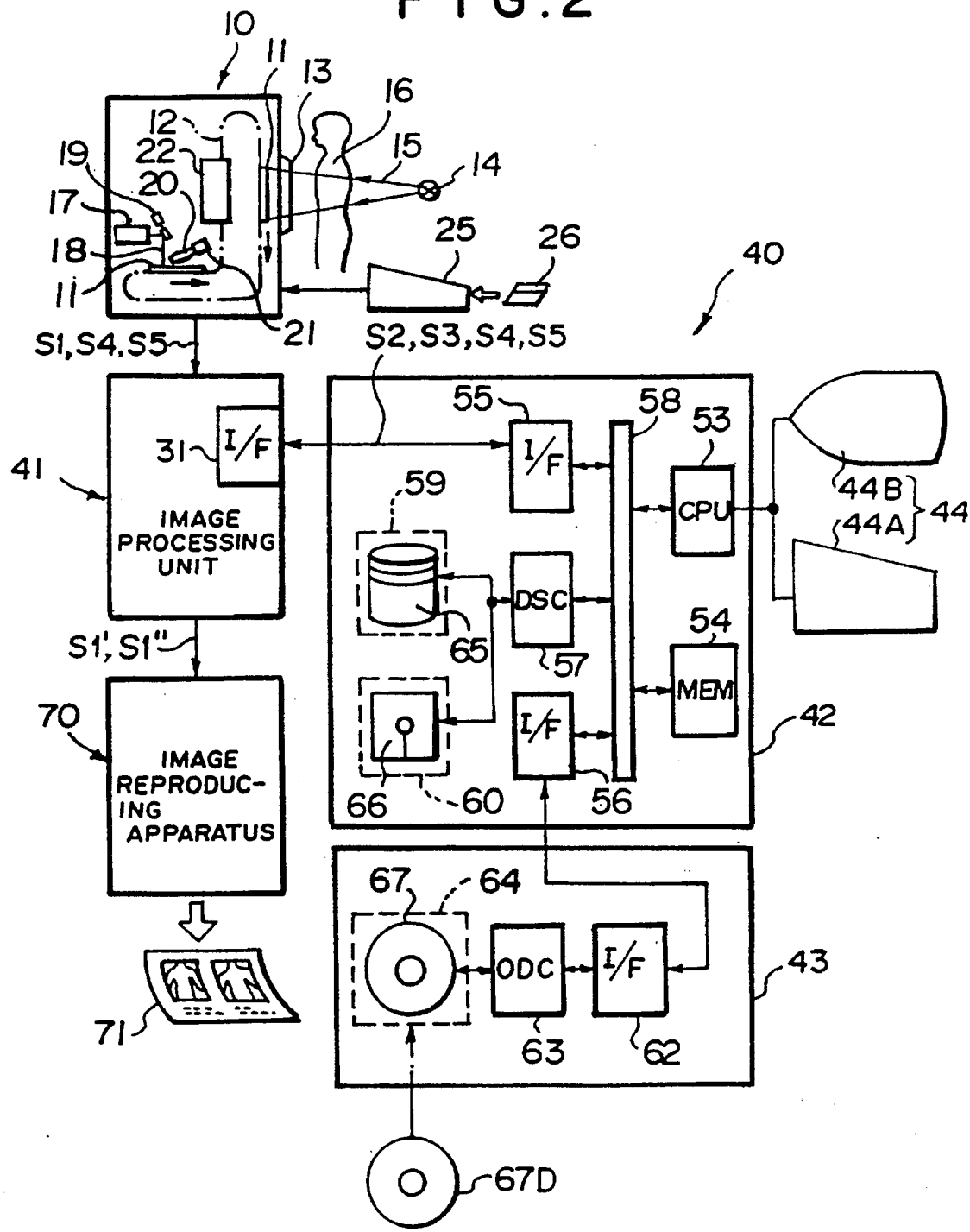
FIG. 2 is a schematic view showing an embodiment of the image filing apparatus in accordance with the present invention.

FIG. 2 is a schematic view showing an example of a patient disease diagnosing system wherein an image read-out, filing, and reproducing are carried out and wherein an embodiment of the image filing apparatus in accordance with the present invention is employed.

Referring to FIG. 2, an image filing apparatus 40 is constituted of an image processing unit 41, a system control device 42, and an optical disk device 43, with which signals are stored on an optical disk 67 and are read therefrom. The optical disk 67 constitutes an example of the first storage means of the image filing apparatus in accordance with the present invention. The image filing apparatus 40 also comprises an operating console 44 consisting of a keyboard 44A and a cathode ray tube (CRT) display unit 44B. The image processing unit 41 receives an original image signal S1 from a radiation image recording and read-out apparatus 10, which constitutes an example of an image signal source. The image processing unit 41 carries out predetermined image processing on the original image signal S1, and sends an image signal S1', which has been obtained from the image processing, to an image reproducing apparatus 70.

The radiation image recording and read-out apparatus 10 may be of the type disclosed in, for example, U.S. Pat. Nos. 5,028,785 and 4,705,953. In the radiation image recording and read-out apparatus 10, stimulable phosphor sheets 11, 11 are conveyed and circulated along a circulation path 12. A stimulable phosphor sheet 11 is stopped at the position facing an image recording stand 13 and is exposed to radiation 15, which is produced by a radiation source 14 and which has passed through an object (patient) 16. In this manner, a radiation image of the object 16 is stored on the stimulable phosphor sheet 11. The stimulable phosphor sheet 11, on which the radiation image has been stored, is conveyed to an image read-out section. At the image read-out section, the stimulable phosphor sheet 11, on which the radiation image has been stored, is scanned in a main scanning direction with a laser beam 18, which is produced by a laser beam source 17 and deflected by a light deflector 19. At the same time, the stimulable phosphor sheet 11, on which the radiation image has been stored, is moved in a sub-scanning direction, which is approximately normal to the main scanning direction. In this manner, the stimulable phosphor sheet 11, on which the radiation image has been stored, is two-dimensionally scanned with the laser beam 18. The laser beam 18 serves as stimulating rays. As the stimulable phosphor sheet 11 is exposed to the laser beam 18, the exposed portion of the sheet 11 emits light in proportion to the amount of energy stored thereon during its exposure to the radiation 15. The emitted light is photoelectrically detected by a photodetector 21, which is constituted of a photomultiplier or the like, via a light guide member 20. An analog output signal generated by the photodetector 21 is amplified and converted into a digital original image signal S1. The digital original image signal S1, which is thus obtained and which represents the radiation image of the object 16, is fed out of the radiation image recording and read-out apparatus 10. After the image read-out operation is finished in this manner, the stimulable phosphor sheet 11 is sent to an erasing section 22. At the erasing section 22, the stimulable phosphor sheet 11 is exposed to erasing light, and any energy remaining on the sheet 11 is erased to such an extent that the sheet 11 may be reused for the recording of a radiation image.

The radiation image recording and read-out apparatus 10 is connected to an ID terminal 25. At the ID terminal 25, information written on an ID card 26 for the patient 16 (hereinafter referred to as patient information) is read out. The patient information includes, for example, the name, the sex, and the date of birth of the patient. Also, information about characteristics of the recorded radiation image (hereinafter referred to as image characteristics information) is entered at the ID terminal 25. The image characteristics information includes, for example, the image number, the date on which the image was recorded, the portion of the object the image of which was recorded, the size of the recorded image, and the sensitivity with which the image is read out. The patient information S4 and the image characteristics information S5 are fed to the image processing unit 41 together with the original image signal S1.

The image processing unit 41 can carry out, for example, at least 20 types of gradation processes and at least 10 types of frequency response processes on the original image signal S1. The image processing conditions are tabulated, and optimal image processing conditions are automatically selected from the table in accordance with the characteristics of the recorded radiation image, which are designated at the ID terminal 25. The image signal S1', which is obtained by carrying out image processing under optimal conditions in the image processing unit 41, is sent to the image reproducing apparatus 70.

By way of example, the image reproducing apparatus 70 is composed of a light beam scanning and recording apparatus for two-dimensionally scanning photographic film with a light beam, which has been modulated in accordance with the image signal S1', and an automatic developing machine for developing the film, which has been exposed to the light beam. With the image reproducing apparatus 70, the image represented by the image signal S1', i e the radiation image of the patient 16, is recorded as a hardcopy 71 on the photographic film.

The hard copy 71 of the radiation image, which has been formed on the photographic film in the manner described above, is utilized for making a diagnosis of the patient 16. Instead of being constituted of the light beam scanning and recording apparatus and the automatic developing machine, the image reproducing apparatus 70 may be constituted of a CRT display device, or the like.

How an image signal representing a radiation image is stored (filed) by the image filing apparatus 40 will be described hereinbelow.

Figure 1:
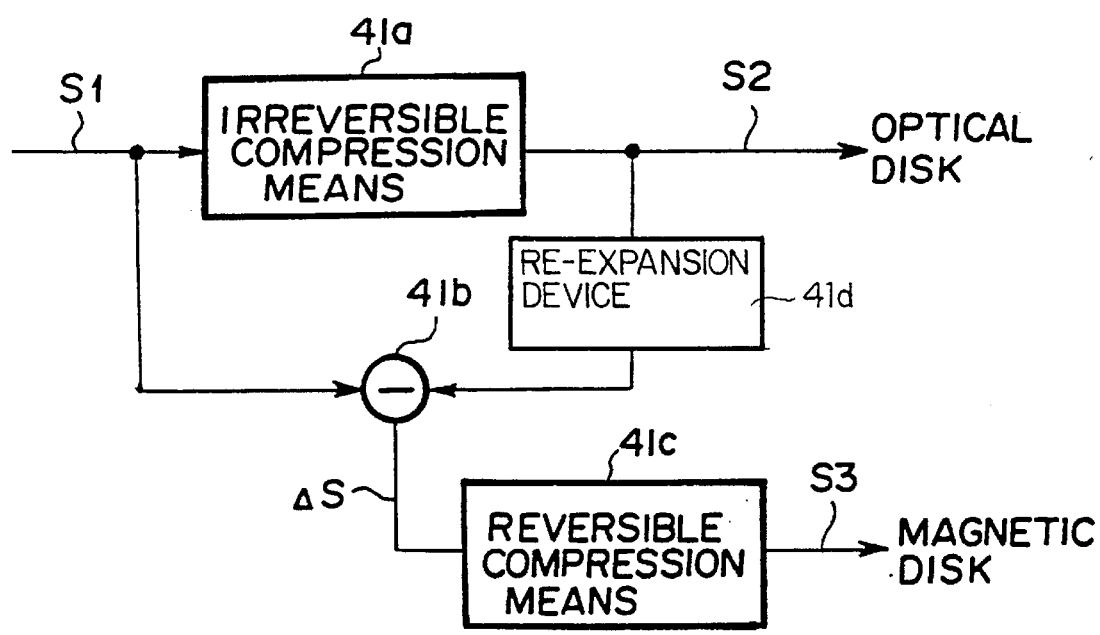
FIG. 1 is a block diagram showing how operations are carried out in an image filing apparatus of FIG. 2.

FIG. 1 is a block diagram showing how operations are carried out in the image processing unit 41. In this embodiment, the operations corresponding to the irreversible signal compression means, the difference operation means, and the reversible signal compression means of the image filing apparatus in accordance with the present invention are carried out in the image processing unit 41. Therefore, the combinations of the hardware functions and the software functions for carrying out the corresponding operations in the image processing unit 41 constitute examples of the irreversible signal compression means, the difference operation means, and the reversible signal compression means of the image filing apparatus in accordance with the present invention.

As described above, the image processing unit 41 carries out image processing on the original image signal S1, which is received from the radiation image recording and read-out apparatus 10. The image signal obtained from the image processing is fed into the image reproducing apparatus 70. Also, the image processing unit 41 is provided with an irreversible signal compression means 41a (actually, the combination of the hardware functions and the software functions of the image processing unit 41). The irreversible signal compression means 41a carries out irreversible signal compression processing on the original image signal S1 and thereby generates an irreversibly compressed image signal S2. Thereafter, a difference operation means 41b subtracts the image signal components of the original image signal S1 and the irreversibly compressed image signal S2 from each other which represent corresponding picture elements in the original image and the image represented by the irreversibly compressed image signal S2. It can be readily understood by one skilled in the art that the difference operation means 41b does not subtract signals S1 and S2 themselves, but rather, subtracts the image signal components of the original image signal S1, which represent picture elements in the original image, and the image signal components of the irreversibly compressed image signal S2, which represent picture elements in the image represented by the irreversibly compressed image signal S2 which correspond to the picture elements in the original image. Hence, since it is the corresponding picture elements of the original image and the image represented by the original image signal S1 and irreversibly compressed image signal S2, respectively, that are being subtracted, and not the signals S1 and S2 themselves, the system inherently includes a reexpansion device 41d which reexpands the irreversibly compressed image signal S2 to a reexpanded signal S2' so that the picture elements in the image represented by the irreversibly compressed image signal S2 can be made to correspond to the picture elements in the original image. A difference image signal ΔS is thereby generated which represents a difference image corresponding to the differences between the image signal components represented by the original image signal S1 and the image signal components represented by the reexpanded irreversibly compressed image signal S2'. The subtracting operations are represented by the formula $$\Delta S = S1 - S2'$$

Thereafter, a reversible signal compression means 41c carries out reversible signal compression processing on the difference image signal ΔS, and a reversibly compressed difference image signal S3 is thereby generated. No limitation is imposed on how the irreversible signal compression processing and the reversible signal compression processing are carried out. The irreversibly compressed image signal S2 and the reversibly compressed difference image signal S3 are fed into the system control device 42 together with the patient information S4 and the image characteristics information S5, which have been received from the radiation image recording and read-out apparatus 10 together with the original image signal S1.

The system control device 42 is constituted of a known computer system. Specifically, the system control device 51 is composed of a central processing unit (CPU) 53, a memory 54, interfaces 55 and 56, a control unit 57, a bus 58 which connects these sections, a fixed magnetic disk drive unit 59, and a floppy disk drive unit 60. The control unit 57 controls the fixed magnetic disk drive unit 59 and the floppy disk drive unit 60. The fixed magnetic disk drive unit 59 and the control unit 57, which controls it, constitute an example of the first storage means of the image filing apparatus in accordance with the present invention. The aforesaid keyboard 44A and the CRT display unit 44B are connected to the CPU 53, and the interface 55 is connected to an interface 31 of the image processing unit 41. The optical disk device 43 is composed of an interface 62, which is connected to the interface 56 of the system control device 42, an optical disk drive control unit 63, and an optical disk drive unit 64. The optical disk 67 is inserted into the optical disk drive unit 64.

In the system control device 42, a plurality of reversibly compressed difference image signals S3, are sequentially stored in the region of a fixed magnetic disk 65 for storing the reversibly compressed image signals. The fixed magnetic disk 65 is operated by the fixed magnetic disk drive unit 59. The storage capacity of the fixed magnetic disk 65 is smaller than the storage capacity of an optical disk, or the like. Therefore, the region of the fixed magnetic disk 65 for storing the reversibly compressed image signals fills before long with the reversibly compressed difference image signals S3. Thereafter, when a new reversibly compressed difference image signal S3 is to be stored on the fixed magnetic disk 65, the oldest one of the reversibly compressed difference image signals S3 stored on the fixed magnetic disk 65 is erased. A new reversibly compressed difference image signal S3 is then stored in the resulting empty area of the fixed magnetic disk 65. In this manner, the reversibly compressed difference image signals S3 stored on the fixed magnetic disk 65 may be erased starting with the oldest one. Alternatively, the reversibly compressed difference image signals S3 may be erased starting with the one which was accessed (read out) least frequently in the past. As another alternative, the reversibly compressed difference image signal S3 which is to be erased may be designated by the operator. As a further alternative, a reversibly compressed difference image signal S3 may be erased when a predetermined period of time has occurred after it was stored on the fixed magnetic disk 65. In this embodiment, the region of the fixed magnetic disk 65 for storing the reversibly compressed image signals constitutes an example of the second storage means of the image filing apparatus in accordance with the present invention.

The patient information S4 and the image characteristics information S5, which have been entered from the ID terminal 25 of the radiation image recording and read-out apparatus 10, are also stored in a data base storing region of the fixed magnetic disk 65. In this manner, a data base for image signal retrieval is constructed on the fixed magnetic disk 65. A floppy disk 66 is operated by the floppy disk drive unit 60 and is utilized for control of system operations.

The irreversibly compressed image signal S2, which is received together with the reversibly compressed difference image signal S3 from the image processing unit 41, is stored on the optical disk 67, which is operated by the optical disk drive unit 64. The patient information S4 and the image characteristics information S5 are also stored on the optical disk 67 together with the irreversibly compressed image signal S2. The optical disk 67, which is inserted into the optical disk drive unit 64, is exchangeable. When the optical disk 67, which is inserted into the optical disk drive unit 64, fills with signals and no more signal can be stored thereon, the optical disk 67 is removed from the optical disk drive unit 64. A new optical disk 67D is then inserted into the optical disk drive unit 64. In this embodiment, the optical disk 67 constitutes an example of the first storage means of the image filing apparatus in accordance with the present invention.

In the manner described above, the data base is constructed on the fixed magnetic disk 65. Also, the reversibly compressed difference image signals S3 which were obtained comparatively recently, are stored on the fixed magnetic disk 65. The irreversibly compressed image signals S2, S2, . . . are stored on the optical disk 67.

How an image signal is retrieved and a visible image is reproduced from the retrieved image signal will now be described below.

As described above, the data base for image signal retrieval has been constructed on the fixed magnetic disk 65 shown in FIG. 2. An operator operates the keyboard 44A to enter the desired retrieval information, using the CRT display unit 44B of the operating console 44. The system control device 42 retrieves image signals, which correspond to the entered retrieval information, from the data base constructed on the fixed magnetic disk 65, and displays a list of the image signals on the CRT display unit 44B. Basically, as the retrieval information, all items of the patient information S4 and the image characteristics information S5 can be used. For example, when the name of a patient, which is one item of the patient information S4, is designated as the retrieval information, an image signal list is displayed on the CRT display unit 44B. The image signal list indicates the image signal numbers of all images of the designated patient, the patient information S4 other than the name of the patient, and the image characteristics information S5. The operator selects a desired image signal from the displayed image signal list, and reserves the reproduction of the image from the image signal. Information about the reserved image signal number is stored in the memory 54. In this manner, the image signal retrieval operation can be carried out independently even though the image processing unit 41 and the image reproducing apparatus 70 are in operation for reproducing an image from the original image signal S1, which is received from the radiation image recording and read-out apparatus 10, or for generating an irreversibly compressed image signal S2 or a reversibly compressed difference image signal S3. Also, even if the image signal to be retrieved is one recorded on an optical disk other than the optical disk 67 that is in the optical disk device 43 at the time of the image signal retrieval, the retrieval operation carried out as described above does not become invalid. After the aforesaid reservation was carried out, image reproduction can be carried out when the optical disk, on which the reserved image signal is recorded, is inserted into the optical disk drive unit 64.

When information indicating the cessation of the operation of the image processing unit 41 is entered into the system control device 42 after the aforesaid reservation was carried out, the system control device 42 reads the reversibly compressed difference image signal S3, which corresponds to the reserved image signal, from the fixed magnetic disk 65. Also, the system control device 42 reads the irreversibly compressed image signal S2, which corresponds to the reserved image signal, from the optical disk 67. In cases where the reversibly compressed difference image signal S3, which corresponds to the reserved image signal, has not been stored on the fixed magnetic disk 65, only the irreversibly compressed image signal S2, which corresponds to the reserved image signal, is read from the optical disk 67.

The reversibly compressed difference image signal S3 and the irreversibly compressed image signal S2, which have thus been read from the fixed magnetic disk 65 and the optical disk 67, (or only the irreversibly compressed image signal S2 which has thus been read) are transferred from the system control device 42 to the image processing unit 41. Also, the patient information S4 and the image characteristics information S5, which correspond to these reversibly compressed difference image signal S3 and the irreversibly compressed image signal S2, are transferred from the system control device 42 to the image processing unit 41.

In cases where both the reversibly compressed difference image signal S3 and the irreversibly compressed image signal S2 are fed into the image processing unit 41, the image processing unit 41 carries out signal decompression processing on the reversibly compressed difference image signal S3 in order to generate the difference image signal ΔS. Thereafter, the image signal components of the difference image signal ΔS and the irreversibly compressed image signal S2 are added to each other, which represent corresponding picture elements in the difference image and the image represented by the irreversibly compressed image signal S2. In this manner, the original image signal S1 is re-generated. After the original image signal S1 is thus generated, the image processing unit 41 carries out appropriate image processing, such as gradation processing or frequency response processing, on the original image signal S1. The image processing unit 41 feeds an image signal S1", which is obtained from the image processing, into the image reproducing apparatus 70. The image reproducing apparatus 70 reproduces a visible image from the processed image signal S1" in the same manner as that described above. In this manner, a hard copy 71 of the radiation image is formed. The patient information S4 and the image characteristics information S5 are utilized for writing the patient information and the image characteristics information on the hard copy 71.

In cases where no reversibly compressed difference image signal S3 is transferred from the system control device 42 into the image processing unit 41, but only the irreversibly compressed image signal S2 is fed into the image processing unit 41, the image processing unit 41 carries out signal decompression processing on the irreversibly compressed difference image signal S2. Thereafter, the image processing unit 41 carries out appropriate image processing, such as gradation processing or frequency response processing, on the image signal obtained from the signal decompression processing. The image processing unit 41 feeds an image signal, which is thus obtained from the image processing, into the image reproducing apparatus 70. The image reproducing apparatus 70 reproduces a visible image from the processed image signal in the same manner as that described above. In this manner, a hard copy 71 of the radiation image is formed.

As described above, in this embodiment, the irreversibly compressed image signal S2 is generated and stored on the optical disk 67. As for each of images which were obtained comparatively recently and are retrieved comparatively frequently, the difference between the original image signal S1 and the irreversibly compressed image signal S2 are calculated. The reversible signal compression processing is then carried out on the difference image signal ΔS which has thus been obtained, and the reversibly compressed difference image signal S3 is thereby generated. The reversibly compressed difference image signal S3 is stored on the fixed magnetic disk 65. Therefore, as for the images which were obtained comparatively recently, visible images having good image quality can be reproduced from the corresponding image signals. Also, with this embodiment wherein the reversibly compressed difference image signal S3 is stored on the fixed magnetic disk 65, a fixed magnetic disk 65 having a smaller storage capacity can be utilized than with the conventional technique, wherein reversible signal compression processing is carried out on the original image signal S1 in order to generate a reversibly compressed image signal and the reversibly compressed image signal is stored on the fixed magnetic disk 65. Also, when the storage capacity of the fixed magnetic disk 65 is the same, image signals, from which visible images having good image quality can be reproduced, can be stored for a longer period than with the conventional technique.

In the aforesaid embodiment, the optical disk 67 and the fixed magnetic disk 65 are utilized respectively as the first storage means and the second storage means of the image filing apparatus in accordance with the present invention. However, the first storage means and the second storage means of the image filing apparatus in accordance with the present invention are not limited to the optical disk 67 and the fixed magnetic disk 65. Also, the image filing apparatus in accordance with the present invention is not limited to the apparatuses wherein image signals representing radiation images are filed. The image filing apparatus in accordance with the present invention is also applicable when image signals representing other kinds of medical images, such as CT images and MR images, and general types of images are filed.

What is claimed is:

1. An image filing apparatus comprising:
   an image recording and read-out device comprising:
      a reading device which reads an image from a medium and provides an original image signal; and
      a data entering device which provides data signals to said reading device, said data signals representing information pertaining to the image on said medium, said image recording and read-out device outputting said original image signal and said data signals;
   an image processing unit which receives said original image signal and said data signals directly from said image recording and read-out device, comprising:
      i) means for distinguishing said original image signal from said data signals;
      ii) irreversible signal compression means for carrying out irreversible signal compression processing on said original image signal, said original image signal being made up of a series of image signal components representing said image on said medium, and thereby generating an irreversibly compressed image signal;
      iii) difference operation means for subtracting the image signal components of a re-expanded signal of said irreversibly compressed image signal from said original image signal, and then generating a difference image signal, which represents a difference image corresponding to the differences between said original image signal and said re-expanded irreversibly compressed image signal;
      iv) reversible signal compression means for carrying out reversible signal compression processing on said difference image signal, and thereby generating a reversibly compressed difference image signal; and
      v) means for outputting said irreversibly compressed image signal, said reversibly compressed difference image signal, and said data signals; and
   an image filing device which receives said irreversibly compressed image signal, said reversibly compressed difference image signal, and said data signals directly from said image processing unit, comprising:
   first storage means for storing said irreversibly compressed image signal; and
   second storage means, separate from said first storage means, on which information can be rewritten and which stores said reversibly compressed difference image signal.

2. An apparatus as defined in claim 1 wherein said original image is a medical image.

3. An apparatus as defined in claim 1 wherein said original image is a radiation image.

4. An apparatus as defined in claim 3 wherein said radiation image is a medical image.

5. An apparatus as defined in claim 3 wherein said radiation image is stored on a stimulable phosphor sheet, and an image signal representing said radiation image is obtained by exposing the stimulable phosphor sheet to stimulating rays, which cause it to emit light in proportion to the amount of energy stored thereon during its exposure to radiation, and photoelectrically detecting the emitted light.

6. An apparatus as defined in claim 1 wherein said first storage means comprises an optical disk, and said second storage means comprises a magnetic disk.

7. An apparatus as defined in claim 1 wherein said first and second storage means each comprise a magnetic disk.

* * * * *